United States Patent
Robert et al.

(10) Patent No.: US 8,535,848 B2
(45) Date of Patent: *Sep. 17, 2013

(54) STRUCTURED BODY FOR AN ANODE USED IN FUEL CELLS

(75) Inventors: Gilles Robert, Zurich (CH); Andreas Franz-Josef Kaiser, Elgg (CH); Emad Batawi, Winterthur (CH)

(73) Assignee: Hexis AG, Winterthur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,607

(22) Filed: Jan. 9, 2012

(65) Prior Publication Data

US 2012/0141916 A1    Jun. 7, 2012

Related U.S. Application Data

(62) Division of application No. 10/355,624, filed on Jan. 31, 2003, now Pat. No. 8,114,551.

(30) Foreign Application Priority Data

Mar. 4, 2002    (EP) .................................... 02405163

(51) Int. Cl.
*H01M 8/10*    (2006.01)

(52) U.S. Cl.
USPC ........... 429/486; 429/488; 429/495; 429/528; 429/533

(58) Field of Classification Search
USPC .................................. 429/454, 482, 480, 495
See application file for complete search history.

(56) References Cited

U.S. PATENT DOCUMENTS

| | | | |
|---|---|---|---|
| 3,503,809 A * | 3/1970 | Spacil | 429/486 |
| 5,114,803 A * | 5/1992 | Ishihara et al. | 429/495 |
| 5,453,330 A | 9/1995 | Kawasaki et al. | |
| 5,807,642 A | 9/1998 | Xue et al. | |
| 6,017,647 A | 1/2000 | Wallin | |
| 2002/0061429 A1* | 5/2002 | Batawi et al. | 429/30 |
| 2002/0142210 A1* | 10/2002 | Kaiser et al. | 429/36 |

FOREIGN PATENT DOCUMENTS

| | | | |
|---|---|---|---|
| DE | 19819453 A1 | 11/1999 | |
| WO | WO 02/03491 A1 | 1/2002 | |

\* cited by examiner

*Primary Examiner* — Patrick Ryan
*Assistant Examiner* — Alex Usyatinsky
(74) *Attorney, Agent, or Firm* — Kilpatrick Townsend & Stockton LLP

(57) ABSTRACT

The structured body intended for use for an anode (1) in fuel cells, includes a structure formed by macro-pores and an electrode material. The macro-pores form communicating spaces which are produced by using pore forming materials. The electrode material includes skeleton-like or net-like connected structures of particles which are connected by sintering and which form two reticular systems which interengage: a first reticular system made of ceramic material and a second reticular system which contains metals to effect an electrical conductivity. The electrode material has the properties so that, with a multiple change between oxidizing and reducing conditions, substantially no major property changes occur in the ceramic reticular system, and an oxidization or reduction of the metals occurs in the second reticular system.

16 Claims, 3 Drawing Sheets

STRUCTURED BODY FOR AN ANODE USED IN FUEL CELLS

CROSS-REFERENCES TO RELATED APPLICATIONS

This application is a divisional of U.S. patent application Ser. No. 10/355,624, filed Jan. 31, 2003, which claims the benefit of European Patent Application No. 02 405 163.3, filed Mar. 4, 2002; each preceding disclosure is incorporated by reference herein.

BACKGROUND OF THE INVENTION

The invention relates to a structured body for an anode used in fuel cells which is briefly termed an anode structure in the following. The invention also relates to a high temperature fuel cell having such an anode structure and to a method of manufacturing the anode structure in accordance with the invention.

A high temperature fuel cell (SOFC fuel cell) is known from DE-A-19 819 453 in which an anode substrate forms a support structure. An intermediate anode layer, a solid electrolyte, preferably in the form of a very thin layer, and a layer-like cathode are applied to this support structure. The anode substrate and the intermediate anode layer are manufactured from the same material, namely from a porous cermet which consists of the ceramic material YSZ (yttrium stabilized zirconium oxide), which is also used as the solid electrolyte, and nickel. Electro-chemical reactions take place at so-called three-phase points (nickel/electrolyte/pore) in the contact region between the anode and the electrolyte in which nickel atoms are oxidized by oxygen ions ($O^{2-}$) of the electrolyte and these are reduced again by a gaseous fuel ($H_2$, CO), with $H_2O$ and $CO_2$ being formed and the electrons released in the oxidization being passed on by the anode substrate. To obtain a large density of points for these three-phase points, a composition of the intermediate anode layer is provided for which the ratio of the proportions by volume of nickel, YSZ and pores lies close to 1:1:1.

The aim of the largest possible density of the three-phase points is, however, of lesser importance with respect to a further problem, namely with respect to the requirement that the anode should have a so-called redox stability. The redox stability relates to the properties of the electrode material with respect to a multiple change between oxidizing and reducing conditions. On the one hand, this change, which is briefly termed a redox change in the following, should not result in any major changes in properties for the ceramic components. On the other hand, an irreversible change, i.e. an ageing of the metallic components as a result of the redox change, should be influenced by means of the constant ceramic components such that the electrical conductivity of the electrode material is largely maintained. With such an ageing, a grain growth of the nickel takes place in which large crystallites grow at the cost of small ones and so allow gaps to arise in electrically conductive connections of the anode structure.

The redox stability is very important in practice because, according to experience, it is not possible to keep a battery with fuel cells in continuous operation. At each operation stop, the supply of the fuel must be stopped for safety reasons. When the gaseous fuel is absent, oxygen penetrates onto the anode sides of the fuel cells and the previously reduced state of the nickel changes into the oxidized state. When fuel cells are used in domestic technology for the purpose of the simultaneous production of electrical and thermal energy, around 20 interruptions to operation can be expected per year. A fuel cell must be usable for around five years for economical reasons. The fuel cell must thus only age so fast that up to 100 redox changes are possible.

However, in addition to the redox stability, good gas permeability of the anode structure is also important, as is—with respect to commercial use—a production of the anode structure which should be economical.

SUMMARY OF THE INVENTION

It is an object of the invention to provide an anode structure which is sufficiently good with respect to redox stability, gas permeability and efficiency for use in fuel cells. This object is satisfied by the anode structure in accordance with the embodiments of the present invention.

The structured body, which is provided for use for an anode in fuel cells, has a structure formed by macro-pores and an electrode material. The macro-pores form communicating spaces which are produced by pore forming materials. The electrode material includes skeleton-like or net-like connected structures of particles connected by sintering which form two reticular systems which interengage or cross into one another: a first reticular system of ceramic material and a second reticular system which includes metals to bring about electrical conductivity. The electrode material has the properties so that, with multiple changes between oxidizing and reducing conditions, no major changes in properties occur in the ceramic reticular system, on the one hand, and an oxidization or reduction of the metals results in the second reticular system, on the other hand. In addition, the two reticular systems together form a compact structure which includes micro-pores in the oxidized state whose proportion by volume is less than 20%, preferably less than 5%, with respect to the electrode material.

The term "reticular system" has been introduced here. This is to be understood as a skeleton-like or net-like connected structure of particles. Due to the connection of the reticular system, this is given a structural stability and/or electrical conductivity. No chemical changes can take place in the reticular system so that structural stability is present. This is the case for the ceramic reticular system. The second reticular system has a structure which changes due to the redox change such that only a low structural stability is present. The function of the second reticular system as an electrically conductive connection is maintained due to the structural stability of the first reticular system. The two reticular systems result in a natural manner in the form of a statistical distribution of constituting particles if these particles are prepared such that they each have a narrow size spectrum for the two particle kinds when the proportion by volume for each reticular system amounts to at least 30% and when the particles are mixed homogeneously with one another. (However, even relatively large particles, which are included in insular manner in a matrix of fine particles, may be mixed in the ceramic reticular systems.) The system formed by the pores is likewise a reticular system. This reticular system results in the required gas permeability of the anode structure.

In a preferred embodiment, the anode structure in accordance with the invention has both the function of a support structure and the function of the above-mentioned intermediate anode layer. It can, however, also only form the supporting part of the anode which serves as a support structure for an intermediate anode layer. The body in accordance with the structure must be made so strong as the support structure that it withstands a mechanical load of, for example, 20 kPa; a load of this order of magnitude is typically present on installation in a stack-like arrangement of fuel cells.

The present invention enables various advantageous anode structures. Furthermore, the present invention enables the formation of a high temperature fuel cell having these advantageous anode structures.

The invention will be explained in the following with reference to the drawings.

DESCRIPTION OF THE PREFERRED EMBODIMENTS

Figure 1:
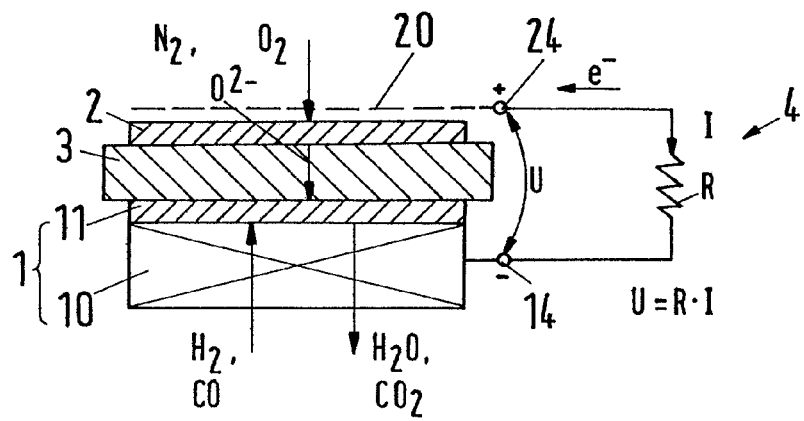
FIG. 1 is a schematic representation of a fuel cell.

In a high temperature fuel cell such as is shown schematically in FIG. 1, electrode reactions are carried out to produce an electric current I; that is, reducing reactions arise on or in an anode 1, wherein water or carbon dioxide arise from hydrogen and carbon monoxide, which form the gaseous fuel; and oxidizing reactions arise on a cathode 2 in which ionic oxygen $O^{2-}$ is formed—while taking up electrons $e^-$ from a metallic conductor 20 and a pole 24—from molecular oxygen of a second gas flow (e.g. air: $O_2$ and $N_2$). The oxygen ions move through a solid electrolyte 3, which separates the two electrodes 1, 2 in a gas impermeable manner and which is conductive for the oxygen ions at temperatures above 700° C. The reducing anode reaction takes place with the oxygen ions while emitting electrons to a further metallic conductor which produces a connection to a pole 14. A consumer 4 is arranged between the poles 14, 24 which load the fuel cell with a resistance R. The voltage U between the poles 14, 24 is produced by a stack of cells connected in series in the practical application of the fuel cell.

In a preferred embodiment, the anode structure 1 has a heterogeneous design made up of a homogeneously structured, porous support structure 10 and a more compact marginal zone 11. The pores of the support structure 10 are macro-pores 100 and micro-pores 110: see FIG. 2. The marginal zone 11 in the example shown includes only micro-pores 110. The adjoining layers, that is, the preferably thin solid electrolyte layer 3 and the cathode 2, can be manufactured, for example, by means of a thermal injection method; they can also be manufactured while using a screen printing method. The material for the electrodes 1 and 2 must be usable at an operating temperature of up to 1000° C. The macro-pores 100 of the anode structure 1 form communicating spaces which result in a permeability for the gaseous fuel which is adequate with respect to the electrode reactions. This permeability exists up to the marginal zone 11 which forms a boundary zone beneath the electrolyte layer 3. A further gas permeability is given in this border zone 11 by the micro-pores 110. The porosity given by micro-pores 110 is larger than shown in the reduced state of the anode structure 1.

Figure 3:
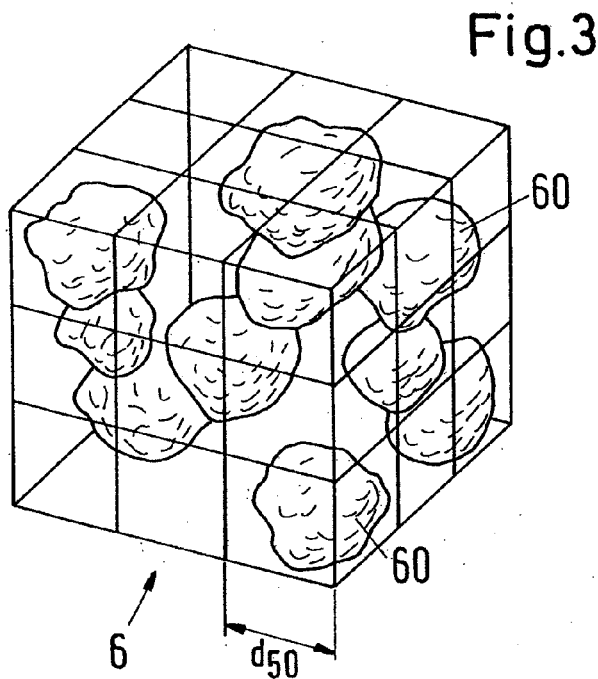
FIGS. 3, 4 are sections from two reticular systems, namely skeleton-like or net-like connected structures of particles.
Figure 4:
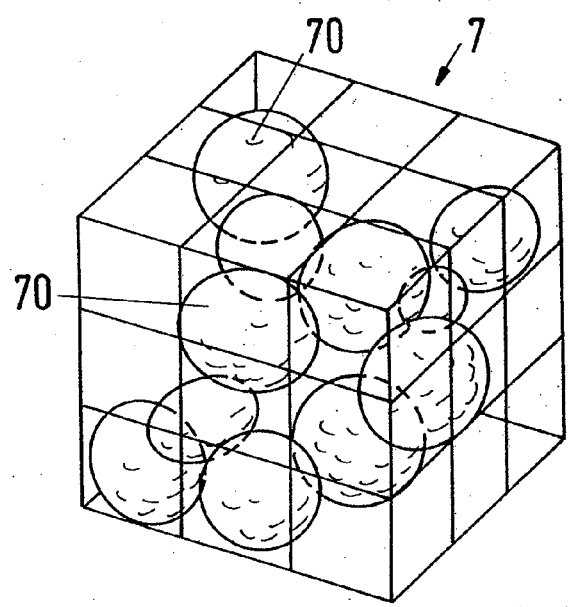
Figure 5:
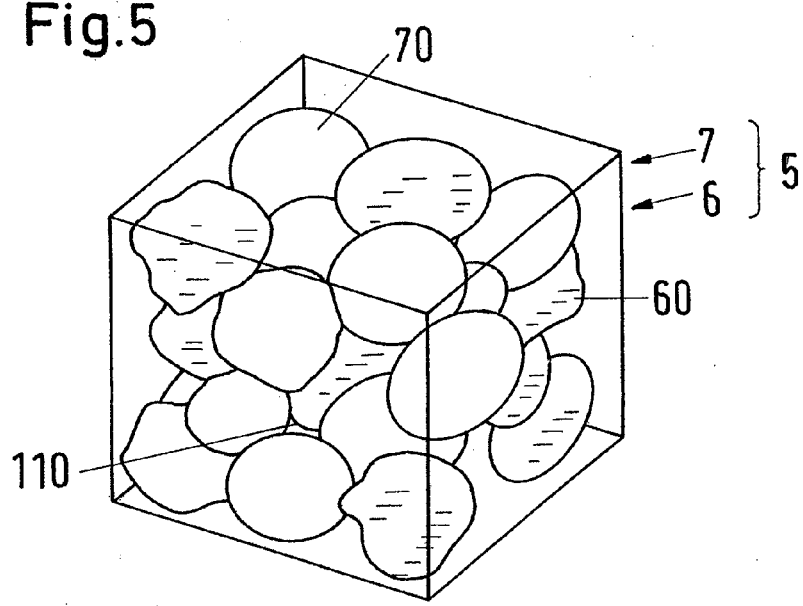
FIG. 5 shows the two reticular systems of FIGS. 3 and 4 which are interengaged.

The anode structure 1 in accordance with the invention has a structure formed by the macro-pores 100 and an electrode material 5. The macro-pores 100 form communicating spaces which are produced by pore forming materials. The electrode material 5—see FIGS. 3 to 5—includes skeleton-like or net-like connected structures made up of particles 60 and 70 connected by sintering. These particles 60, 70 form two reticular systems 6 and 7 (FIG. 5) which are crossed into one another, namely a first reticular system 6 (FIG. 3) of ceramic material and a second reticular system 7 (FIG. 4) which includes metals to effect electrical conductivity. In accordance with the invention, the electrode material 5 has the properties that the following applies with a multiple change between oxidizing and reducing conditions (redox change): on the one hand, no chemical or structural changes occur in the ceramic reticular system. On the other hand, an oxidization or reduction of the metals contained in the particles 70, where ageing occurs, results in the second reticular system due to the redox change. The two reticular systems 6, 7 together form a compact structure which includes micro-pores 110 in the oxidized state whose proportion by volume is less than 20% with respect to the electrode material 5. This proportion by volume is preferably less than 10% or, even better, 5%. During the reduction of the metals, the dimensions of the particles 70 reduce in the second reticular system 7; further micro-pores (not shown) therefore occur. On a repeated oxidization of the metals, these further micro-pores, which should be designated by "type II micro-pores", disappear. The micro-pores 110 of the oxidized anode structure 1 are "type I micro-pores". The "type II micro-pores" have a lower influence on the structural stability of the electrode material 5 than the "type 1 micro-pores".

As was determined empirically, reticular systems result when the particles 60, 70 have diameters whose mean value $d_{50}$ is less than 1 μm prior to sintering ($d_{50}$=50% by volume of the particles have a diameter lower than $d_{50}$). In this connection, micro-pores arise whose diameters are smaller than 3 μm. The redox stability becomes even better for smaller diameters. An anode structure is preferably manufactured such that micro-pores arise with diameters lower than 1 μm. The proportion by volume of the ceramic reticular system—with respect to the electrode material—should amount to at least 30%. So that the ageing does not too quickly result in an intolerable loss in electrical conductivity, the proportion by volume of the second reticular system should be larger than that of the ceramic reticular system, for example larger by at least a factor of 1.5.

The particles must be put into a sufficiently fine form for the formation of the reticular systems. This can be done, for example, by grinding a coarse grain powder. Coarser particles can—if necessary—be removed from the ground product by classification (e.g. by screening). The required powder quality is obtained, for example, by reprocessing the powder by means of spray drying. Suitable finely dispersed particles can also be prepared using methods of nanotechnology: for example by means of reaction spray methods, spray flame pyrolysis, deposition methods or sol/gel methods.

If zirconium oxide, YSZ, is provided as the material for the electrolyte, then the same ceramic material is advantageously also used for the anode structure, i.e. for its first reticular system. Nickel oxide particles, which contain up to 10% by weight of materials other than nickel oxide, are preferably used for the second reticular system. Such nickel oxide particles, which are available on the market as dye components, are available as low-cost raw material. These dye particles advantageously also contain materials which act as sintering aids in the sintering of the anode structure.

It is of advantage in the manufacture of the anode structure in accordance with the invention for additives of at least one kind to be contained in the second reticular system. Such additives can serve as a sintering aid on sintering. Further additives can impede damaging grain growth as inhibitors during the operation of the fuel cell. Oxides or salts of Ni, Mn, Fe, Co and/or Cu can be used as sintering aids and MgO as the inhibitor of grain growth.

The anode structure in accordance with the invention must have communicating spaces which enable permeability for the gaseous fuel which is adequate with respect to the current supplying electrode reactions. This gas permeability is brought about using macro-pores whose diameters lie in the region between 3 and 20 µm. The macro-pores can be manufactured using pore forming materials. For this purpose, particles or fibers of an organic material, in particular cellulose, are used. This organic material is decomposed during sintering which is carried out under oxidizing conditions; the decomposition products evaporate.

Figure 2:
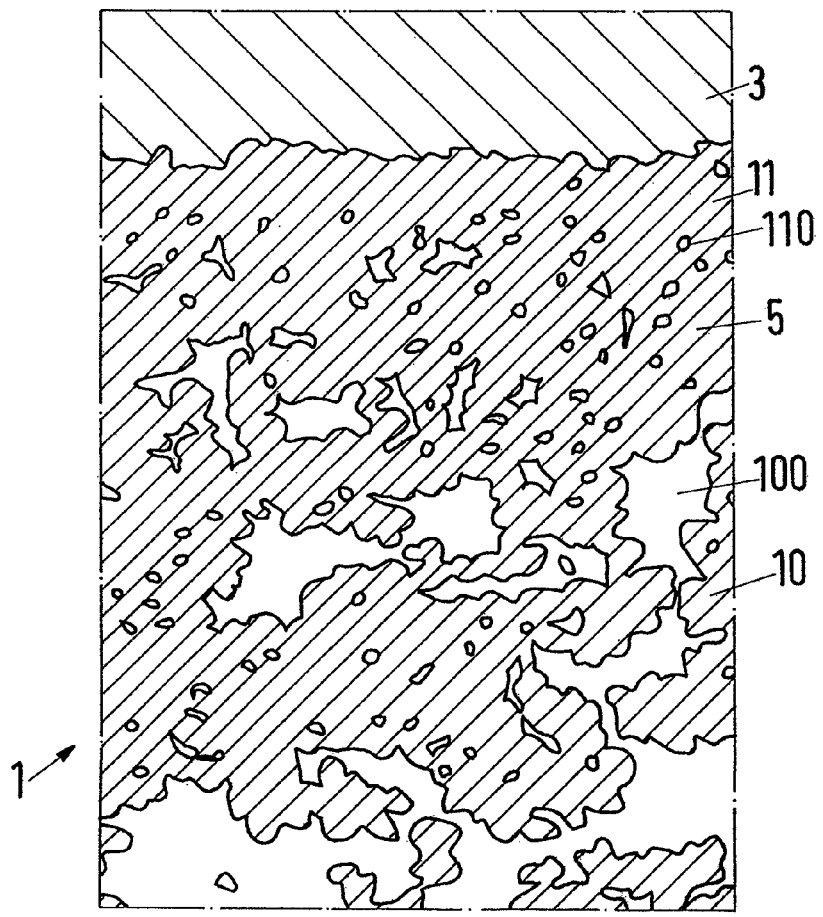
FIG. 2 is a cross-section through a porous material which can be used as an anode structure in accordance with the invention.

In a suitable method of manufacturing the anode structure in accordance with the invention, the procedure is as follows: particles of ceramic material (e.g. YSZ) and of a metal oxide (e.g. green or brown nickel oxide particles) are put into a sufficiently fine form for the formation of the reticular systems by grinding and classification. A homogeneous mixture in the form of a slurry is formed from the particles, the pore forming materials and a liquid. The slurry is cast to form a layer. If the slurry is cast in an absorbent mold, some of the liquid is removed from it. At the same time, a marginal zone arises in which a lack of pore forming materials is present. An inhomogeneous structure thus results such as is shown in FIG. 2.

After a complete removal of the liquid from the slurry layer by drying, sintering is carried out, with the sintering preferably being carried out together with a solid electrolyte applied to the layer. There is an optimum sintering temperature at which a structure with small micro-pores arises, on the one hand, and an unfavorable influencing of the reticular structure remains minimal, on the other hand. The larger the sintering temperature is, the lower is the density of the micro-pores, but the more strongly the reticular structure is impaired.

Figure 6:
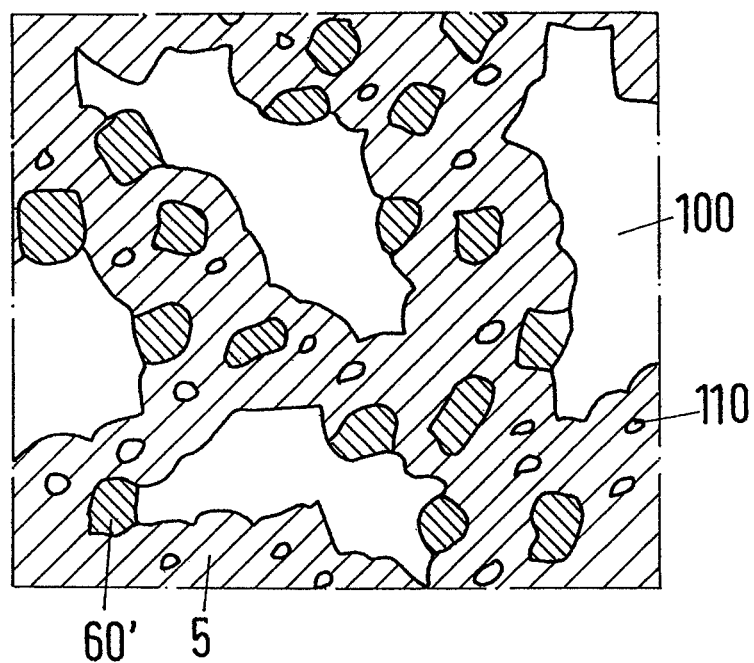
FIG. 6 shows an anode structure in whose electrode material larger particles of ceramic material are incorporated.

FIG. 6 shows an anode structure in whose electrode material 5 larger particles 60' of ceramic material are incorporated. The coarse particles 60' are incorporated in an insular manner in a matrix of the fine particles 60, 70 (see FIG. 5). The manufacturing costs can be reduced with the coarse particles 60', whose diameters lie in the range between 2 and 10 µm, because less material has to be put into the required fine form. A greater strength of the ceramic reticular system can also be obtained with added coarse particles if a lower proportion by volume of micro-pores results due to the coarse particles.

The anode structure in accordance with the invention is made areally, for example in plate-shape or shell-shape. In plate-shape, it has a large extent in two dimensions; in a third dimension, it has a thickness of relatively small extent which is, however, larger than 0.5 mm. The required supporting force of the anode structure is achieved with this thickness.

The ceramic reticular system (6) can consist, in addition to the stabilized zirconium oxide, YSZ, also of aluminum oxide $Al_2O_3$, of titanium oxide $TiO_2$, of doped cerium oxide $CeO_2$, of magnesium oxide MgO, and/or of a spinel compound. Oxides of the substances Y, Ti, Gd and/or Co can be used as doping means for the $CeO_2$.

With the manufacturing method in accordance with the invention and unlike the high temperature fuel cell described in DE-A 19 819 453, an anode structure corresponding to the anode substrate and the intermediate anode layer can be manufactured in common working steps. This is obviously a simplification of the method which has a positive effect on the manufacturing costs.

Further methods known per se can also be used for the manufacture of the anode structure in accordance with the invention: film casting, roll pressing, wet pressing or isostatic pressing.

The invention claimed is:

1. A method of manufacturing a structured body for an anode (1) for use in fuel cells, with the structure body comprising a structure formed by macro-pores (100) and an electrode material (5) whose macro-pores form communicating spaces which are produced by means of pore forming materials and whose electrode material includes skeleton-like or net-like connected structures of particles (60, 70) which form two reticular systems (6, 7) which interengage, namely a first reticular system (6) made of ceramic material and a second reticular system (7) which contains metals to bring about an electrical conductivity, and with the electrode material having the properties that, with a multiple change between oxidizing and reducing conditions, results in an oxidization or reduction of the metals of the second reticular system, and the two reticular systems together form a compact structure which contains micro-pores (110) in the oxidized state whose proportion by volume is less than 20% with respect to the electrode material, wherein the particles (60, 70) are brought into a sufficiently fine form for the formation of the reticular systems (6, 7) so that the particles have a mean diameter $d_{50}$ in the unsintered state that is smaller than 1 µm, wherein mean diameter $d_{50}$ means that 50% by volume of the particles have respective diameters which are less than the mean diameter;

a homogeneous mixture in the form of a slurry is formed from the particles with pore forming materials and a liquid; the slurry is poured to form a layer; and the layer is sintered after removal of the liquid for connecting the particles to form the two reticular systems.

2. The method in accordance with claim 1, wherein the ceramic reticular system (6) can optionally include relatively coarse particles (60') with diameters between 2 and 10 µm; wherein the micro-pores (110) have diameters smaller than 3 µm; and wherein the proportion by volume of the ceramic reticular system (6) with respect to the electrode material amounts to at least 30%.

3. The method in accordance with claim 1, wherein the first reticular system (6) comprises: zirconium oxide stabilized with yttrium (YSZ), aluminum oxide ($Al_2O_3$), titanium oxide ($TiO_2$), doped cerium oxide ($CeO_2$), magnesium oxide (MgO), or a spinel compound.

4. The method in accordance with claim 1, wherein the macro-pores (100) have diameters in the range from 3 to 20 µm.

5. The method in accordance with claim 1, wherein particles or fibers of an organic material, in particular cellulose, are used as pore forming materials for the particles and evaporate on sintering with oxidizing conditions.

6. The method in accordance with claim 1, wherein additives of at least one kind are included in the second reticular system (7), with a first or only kind serving as sintering aids in sintering.

7. The method in accordance with claim 6, wherein oxides or salts of Ni, Mn, Fe, Co and/or Cu are used as sintering aids and/or MgO is used as the inhibitor of grain growth.

8. The method in accordance with claim 6, wherein the structured body is made in plate-like or shell-like form and has a plate thickness or shell thickness which is larger than 0.5 mm.

9. The method in accordance with claim 1, wherein the electrode material (5) can be used at an operating temperature of up to 1000° C.; wherein the structured body for use as an anode forms a support structure (10, 11) for a thin solid electrolyte layer (3) and a cathode (2); and wherein the communicating spaces of the structured body enable a permeability for a gaseous fuel which is sufficient with respect to current supplying electrode reactions, and indeed up to a boundary zone (11) under the electrolyte layer in which a further gas permeability is given by the micro-pores (110) of the electrode material.

10. The method in accordance with claim 1, wherein the sintering of the layer formed is carried out together with a solid electrolyte layer applied to the layer formed.

11. The method including using the structured body manufactured in accordance with claim 1 as an anode of a fuel cell.

12. The method in accordance with claim 1, wherein substantially no property changes occur in the ceramic reticular system with the multiple change between oxidizing and reducing conditions.

13. The method in accordance with claim 1, wherein the particles (60, 70) are brought into the sufficiently fine form (6, 7) by grinding and classification.

14. The method in accordance with claim 2, wherein the micro-pores (110) have diameters smaller than 1 μm.

15. The method in accordance with claim 3, wherein the first reticular system comprises YSZ and wherein the second reticular system comprises at least 90% by weight of nickel oxide.

16. The method in accordance with claim 6, wherein a second kind of additive acts as an inhibitor to grain growth during the operation of the fuel cells.

* * * * *